United States Patent
Yang et al.

(10) Patent No.: US 11,493,595 B2
(45) Date of Patent: Nov. 8, 2022

(54) METHOD AND APPARATUS FOR EVALUATING ACCURACY IN POSITIONING A RECEIVER POINT

(71) Applicants: CHINA NATIONAL PETROLEUM CORPORATION, Beijing (CN); BGP INC., CHINA NATIONAL PETROLEUM CORPORATION, Hebei (CN)

(72) Inventors: Haishen Yang, Beijing (CN); Weiwei Zhao, Beijing (CN); Lijun Xu, Beijing (CN); Yongxin Xiao, Beijing (CN); Kunpeng Hou, Beijing (CN)

(73) Assignees: CHINA NATIONAL PETROLEUM CORPORATION, Beijing (CN); BGP INC., CHINA NATIONAL PETROLEUM CORPORATION, Hebei (CN)

( * ) Notice: Subject to any disclaimer, the term of this patent is extended or adjusted under 35 U.S.C. 154(b) by 374 days.

(21) Appl. No.: 16/768,271

(22) PCT Filed: Nov. 1, 2018

(86) PCT No.: PCT/CN2018/113339
§ 371 (c)(1),
(2) Date: May 29, 2020

(87) PCT Pub. No.: WO2019/105173
PCT Pub. Date: Jun. 6, 2019

(65) Prior Publication Data
US 2020/0371195 A1    Nov. 26, 2020

(30) Foreign Application Priority Data
Nov. 30, 2017  (CN) .......................... 201711236651.0

(51) Int. Cl.
*G01S 5/22*  (2006.01)

(52) U.S. Cl.
CPC ...................................... *G01S 5/22* (2013.01)

(58) Field of Classification Search
CPC ....................................................... G01S 5/22
(Continued)

(56) References Cited

U.S. PATENT DOCUMENTS 6,501,703 B2 * 12/2002 Zhou ...................... G01V 1/362
702/14
2004/0037165 A1    2/2004 Lemenager et al.
(Continued)

FOREIGN PATENT DOCUMENTS

CN       101086534 A    12/2007
CN       101852867 A    10/2010
(Continued)

OTHER PUBLICATIONS

International search report issued for counterpart Chinese patent application No. PCT/CN2018/113339, dated Jan. 31, 2019, 3 pages.
(Continued)

*Primary Examiner* — Aditya S Bhat
(74) *Attorney, Agent, or Firm* — Hoffman Warnick LLC

(57) ABSTRACT

A method for evaluating accuracy in positioning a receiver point, which is associated with at least one shot point, and for which a derived position data is obtained, wherein a pair of the receiver point and a respective shot point is associated with a characteristic parameter which includes an offset, a velocity of first arrival wave and a first arrival time, the method comprising: step S10, constructing a residual vector associated with the receiver point and the respective shot point based on the characteristic parameter; step S12, determining a characterization parameter of the derived position data based on the residual vector; and step S14, evaluating accuracy of the derived position data based on the charac-
(Continued)

terization parameter. An apparatus for evaluating accuracy in positioning a receiver point is also provided.

12 Claims, 3 Drawing Sheets

(58) Field of Classification Search
USPC .......................................................... 702/152
See application file for complete search history.

(56) References Cited

U.S. PATENT DOCUMENTS

| | | |
|---|---|---|
| 2011/0191032 A1 | 8/2011 | Moore |
| 2014/0372044 A1* | 12/2014 | Jiao ....................... G01V 1/282 |
| | | 702/16 |

FOREIGN PATENT DOCUMENTS

| | | |
|---|---|---|
| CN | 101930080 A | 12/2010 |
| CN | 103499835 A | 1/2014 |
| CN | 104391323 A | 3/2015 |
| CN | 108121018 A | 6/2018 |

OTHER PUBLICATIONS

First Office Action and search report for counterpart Chinese patent application No. 201711236651.0, dated Jan. 21, 2019, 18 pages.
Second Office Action for counterpart Chinese patent application No. 201711236651.0, dated Jul. 10, 2019, 19 pages.
Tong et al. "Non-official translation: A secondary Positioning Method Based on First Arrival Fitting", Non-official translation: proceedings of 2017 symposium on Geophysical Exploration Technology, Chinese Petroleum Society, Apr. 30, 2017, abstract, pp. 80-82, and figures 3,4 and 10.
Xiao et al., "A secondary positioning method by grid scanning and curved-Surface fitting in OBC Survey," Oil Geophysical Prospecting, vol. 47, No. 3 (2012).
Yuanjun et al., "Application of acoustic positioning network in 3D seismic exploration of offshore streamer," China Petroleum Exploration vol. 21, No. 2 (2016).
Xu et al., "Iteration pickup method of first break using energy ratio," Progress in Geophysics, vol. 31 No. 2, 845-850 (2016).
Zhou et al., College Physics Experiment, Suzhou, Suzhou , University Press (2006).
Natural gas industry, "Seismic acquisition and processing technology and its application in the beach-sea transition zone," vol. 27 Supplement A, 209-212 (2007).
China Patent Information Center, Novelty Search Report and English translation, Nov. 22, 2017, 10 pages.
Search Report and English translation for Chinese Patent Application No. 201711236651.0, dated Jan. 21, 2019, 10 pages.

* cited by examiner

Δ=5.539
φ=4.37

Δ=0.002
φ=1.84

METHOD AND APPARATUS FOR EVALUATING ACCURACY IN POSITIONING A RECEIVER POINT

This application is a US National Stage of International Patent Application No. PCT/CN2018/113339, filed on Nov. 1, 2018, which claims priority to then Chinese patent application No. 201711236651.0, filed on Nov. 30, 2017, entitled "Method and Apparatus for Evaluating Accuracy in Positioning a Receiver Point", each of which is incorporated herein by reference in their entireties.

TECHNICAL FIELD

The embodiments of the present disclosure relate to the technical field of oil and natural gas, and particularly to a method and apparatus for evaluating accuracy in positioning a receiver point.

BACKGROUND

With the development of the exploration technologies, the Ocean Bottom Cable (OBC) seismic exploration and the Ocean Bottom Node (OBN) seismic exploration have gradually become the main methods for offshore oil resource exploration. In the OBN seismic exploration, node devices (multi-component geophone and signal recording system) are placed on the seabed to receive and record seismic waves fired near the sea level and reflected from deep stratums. Differently from the OBN seismic exploration, in the OBC seismic exploration, geophone cables are placed on the seabed. In both the OBN seismic exploration and the OBC seismic exploration, the receiver points are usually subject to drifting in the process of deployment from the sea level to the seabed, resulting in a change in positions of the receiver points, which necessitates positioning of the receiver points deployed on the seabed. The first break positioning, which is relatively low in cost, is widely utilized in positioning the receiver points.

In the first break positioning, positions of the receiver points are determined by using a certain algorithm, based on the picked first arrival times and shot positions. There are a variety of first break positioning algorithms, such as vector superposition positioning, scanning and fitting positioning, etc. In the first break positioning, it is usually necessary to pick up the first arrival time. The first arrival time refers to the time when a seismic trace initially receives a seismic wave, i.e. the start time. The methods for picking up the first arrival may include automatic pickup, interactive pickup, etc. For the seismic data with a good quality, the interference before the first arrival is insignificant, and basically it is possible to pick up the first arrival automatically and accurately. However, for the seismic data with a poor quality, the interference is significant before the first arrival and even may completely conceal the pattern of the first arrival. In this case, it is often difficult to pick up an accurate first arrival automatically, and it is necessary to introduce manual interaction to accomplish the pickup of the first arrival. The accuracy in picking up the first arrival will be reflected in precision of the calculated position of the receiver point, and then reflected in accuracy of the receiver point positioning.

Therefore, it is desirable to evaluate the accuracy in positioning the receiver points. However, it is silent on effective solutions for evaluating accuracy of receiver point positioning in the related art.

SUMMARY

An objective of the embodiments of the present disclosure is to provide a method and apparatus for evaluating accuracy in positioning a receiver point.

In order to achieve the above objective, an embodiment of the present disclosure provides a method for evaluating accuracy in positioning a receiver point, which is associated with at least one shot point, and for which a derived position data is obtained, wherein a pair of the receiver point and a respective shot point is associated with a characteristic parameter which includes an offset, a velocity of first arrival wave and a first arrival time. The method comprises: constructing a residual vector associated with the receiver point and the respective shot point based on the characteristic parameter; determining a characterization parameter of the derived position data based on the residual vector; and evaluating accuracy of the derived position data based on the characterization parameter.

In order to achieve the above objective, an embodiment of the present disclosure provides an apparatus for evaluating accuracy in positioning a receiver point, comprising: a construction unit configured to construct a residual vector associated with a receiver point and a respective shot point based on a characteristic parameter, wherein the receiver point is associated with at least one shot point and a derived position data is obtained for the receiver point, and a pair of the receiver point and the respective shot point is associated with a characteristic parameter which includes an offset, a velocity of first arrival wave and a first arrival time; a determination unit configured to determine a characterization parameter of the derived position data based on the residual vector; and an evaluation unit configured to evaluate accuracy of the derived position data based on the characterization parameter.

As can be seen from the technical solutions provided in the embodiments of the present disclosure, the residual vector may be constructed based on the characteristic parameter associated with the receiver point and the respective shot point, the characterization parameter of the derived position data of the receiver point may be determined based on the residual vector, and then the accuracy of the derived position data of the receiver point may be evaluated based on the characterization parameter, thereby it is possible to assess advantages and disadvantages of different receiver point positioning methods.

BRIEF DESCRIPTION OF DRAWINGS

In order to describe the technical solutions of the embodiments in the present disclosure or the prior art more clearly, the accompanying drawings for the embodiments or the prior art will be briefly introduced in the following. It is apparent that the accompanying drawings described in the following involve merely some embodiments disclosed in this disclosure, and those skilled in the art can derive other drawings from these accompanying drawings without creative efforts.

DESCRIPTION OF EMBODIMENTS

Figure 1:
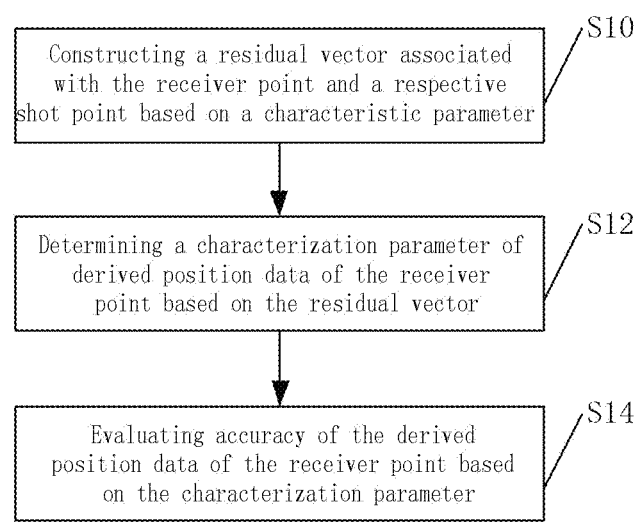
FIG. 1 is a flowchart of a method for evaluating accuracy in positioning a receiver point according to an embodiment of the present disclosure.

The technical solutions of the embodiments in the present disclosure will be clearly and comprehensively described in the following with reference to the accompanying drawings. It is apparent that the embodiments as described are merely some, rather than all, of the embodiments of the present disclosure. All other embodiments obtained by those skilled in the art based on one or more embodiments described in the present disclosure without creative efforts should fall within the scope of this disclosure.

Generally, correct positions of the receiver point may result in aligned first arrival waves after a linear moveout correction (LMO) of the records in a common receiver gather, that is, the first arrival waves are at the same time position. For example, assuming that the positions of the shot points and the receiver point are accurate, accordingly the offsets are accurate, and then the value of the linear moveout correction is equal to the first arrival time, in this case, the records in the common receiver gathers will be aligned to zero position after the linear moveout correction. For another example, assuming that the positions of the shot points are accurate while the position of the receiver point is inaccurate, accordingly the offsets are inaccurate, the records in the common receiver gathers cannot be aligned to zero position but instead fluctuate after the linear moveout correction. The amplitude of fluctuation increases as the error in position of the receiver point increases. When the error in position of the receiver point is significantly large, the records in the common receiver gathers after the linear moveout correction will be apparently uneven. On the other hand, when the error in position of the receiver point is small, it will be difficult to tell whether the records in the common receiver gathers are aligned or not after the linear moveout correction.

Considering the above, a concept of residual vector is introduced into the embodiments of the present disclosure to provide a method for evaluating accuracy in positioning a receiver point, by which a magnitude of error in a derived position of the receiver point can be determined. The method for evaluating accuracy in positioning a receiver point provided in the embodiments of the present disclosure can be applied to any receiver points in any geometries. The geometry usually involves positional relationships between the shot points and the receiver points, and can be used to collect the seismic exploration data. The geometry may include, for example, an orthogonal geometry, a button-type geometry, a sawtooth-type geometry, a radiation-type geometry, a ring-type geometry, etc.

In this embodiment, the receiver point may be associated with at least one shot point in the geometry, and may receive a seismic wave fired by the at least one shot point. A pair of the receiver point and a respective shot point may be associated with a characteristic parameter, which may include an offset, a velocity of first arrival wave, a first arrival time, etc.

Generally, a first break positioning method may be adopted to locate the receiver point, so as to obtain the derived position data of the receiver point. The first break positioning method includes, but is not limited to, vector superposition positioning, scanning and fitting positioning, etc. For example, an observation geometry may be established depending on an geometry, accordingly the derived position data of the receiver point may be coordinate data, specifically $(x_r, y_r, z_r)$, for example. Thus, the offset may be a distance between the derived position of the receiver point and the position of the shot point. The first arrival time may be the time when the receiver point initially receives a seismic wave, that is, the time when the seismic wave fired by the shot point reaches the receiver point. Generally, the first arrival time may be obtained with a first arrival pickup method, which may include, but is not limited to, an automatic pickup method, an interactive pickup method, etc. The velocity of first arrival wave may be a propagation velocity of the first arrival wave, and the first arrival wave may be a signal of the seismic wave that is fired by the shot point and reaches the receiver point first after being reflected by the stratum. Generally, the velocity of first arrival wave can be obtained by using a fitting method. For example, the velocity of first arrival wave may be obtained by plotting the first arrival times in a distance-time coordinate system, and fitting the first arrival times to a straight line or curved line.

For example, the receiver point may be associated with N shot points in the geometry, where N is a natural number greater than zero. An offset between the receiver point and an $i^{th}$ shot point may be $x_i$, the first arrival time associated with them may be $t_i$, and the velocity of the first arrival wave may be $v_i$.

Referring to FIG. 1, the method for evaluating accuracy in positioning a receiver point according to an embodiment of the present disclosure may comprise the following steps.

Step S10: constructing a residual vector associated with the receiver point and a respective shot point based on a characteristic parameter.

Figure 2:
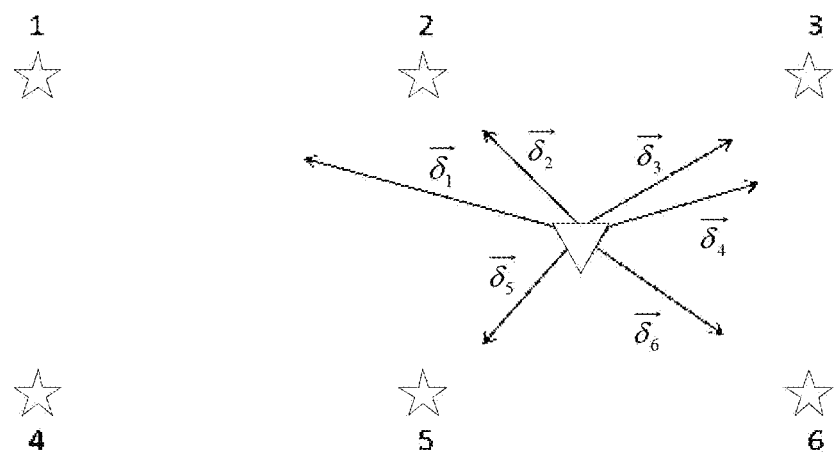
FIG. 2 is a schematic diagram of residual vectors for a receiver point in an embodiment of the present disclosure.

Referring to FIG. 2, in this embodiment, one residual vector $\vec{\delta}_i$ may be constructed for each of the shot points associated with the receiver point. Direction of the residual vector $\vec{\delta}_i$ may be a direction from the receiver point to the shot point. The modulus of the residual vector $\vec{\delta}_i$ may be calculated with an equation $|\vec{\delta}_i|=x_i-t_i \times v_i$, wherein $|\vec{\delta}_i|$ may denote the modulus of a residual vector associated with the receiver point and an $i^{th}$ shot point; $x_i$ may denote an offset between the receiver point and the $i^{th}$ shot point; $t_i$ may denote a first arrival time associated with the receiver point and the $i^{th}$ shot point; and $v_i$ may denote a velocity of first arrival wave associated with the receiver point and the $i^{th}$ shot point.

It should be noted that the direction of the residual vector may include a positive direction and a negative direction. The positive direction may be a direction from the receiver point to the shot point, and the negative direction may be a direction from the shot point to the receiver point.

Step S12: determining a characterization parameter of derived position data of the receiver point based on the residual vector.

Figure 3:
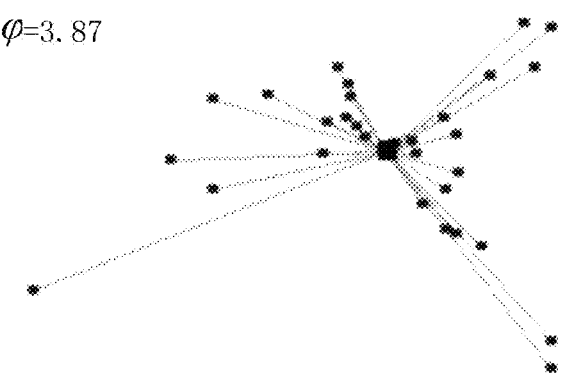
FIG. 3 is a schematic diagram of a dispersion and a vector modulus for a receiver point in an embodiment of the present disclosure.

Referring to FIG. 3, in this embodiment, the characterization parameter may include a dispersion and/or vector modulus.

Specifically, the dispersion of the derived position data of the receiver point may be calculated with an equation $$\varphi = \sqrt{\frac{\sum_{i=1}^{N} |\vec{\delta_i}|^2}{N}},$$

wherein $\varphi$ may denote the dispersion; N may denote the number of shot points associated with the receiver point; and $\vec{\delta_i}$ may denote a residual vector associated with the receiver point and an $i^{th}$ shot point.

Specifically, the vector modulus of the derived position data may be calculated with an equation $\Delta = |\Sigma_{i=1}^{N} \vec{\delta_i}|$ wherein $\Delta$ may denote the vector modulus; N may denote the number of shot points associated with the receiver point; and $\vec{\delta_i}$ may denote a residual vector associated with the receiver point and an $i^{th}$ shot point.

In one implementation of this embodiment, the derived position data of the receiver point may be coordinate data. As usually the value of the coordinate data is remarkably large, the coordinate of the receiver point in the observation geometry may be translated to an origin of the geometry, for facilitating the graphical representation of the residual vector. For example, the coordinate data of the receiver point in the observation geometry may be $(x_r, y_r, z_r)$, and the coordinate data of the receiver point after translation may be (0, 0, 0). In the process of translation, the direction of the residual vector, the magnitude of the residual vector modulus, and the positional relationship among the residual vectors remain unchanged.

Step S14: evaluating accuracy of the derived position data of the receiver point based on the characterization parameter.

In this embodiment, generally in a vector diagram, which may be a graphical representation of the residual vectors associated with the receiver point and the shot points, a relatively small vector modulus corresponds to a receiver point positioned closely to the center point, indicating that the position data of the receiver point is more accurate. On the other hand, for a large vector modulus, the position of the receiver point is deviated from the center in the vector diagram, indicating a large error in the position data of the receiver point. Therefore, the magnitude of the vector modulus may be inversely correlated with the accuracy of the derived position data of the receiver point. Specifically, when the vector modulus is small, it may be determined that the accuracy of the derived position data of the receiver point is high, and when the vector modulus is large, it may be determined that the accuracy of the derived position data of the receiver point is low.

In this embodiment, generally a smaller dispersion corresponds to shorter lengths of the vectors (namely residuals), indicating the position data of the receiver point is more accurate, and a larger dispersion corresponds to longer lengths of the vectors (namely residuals), indicating a large error in the position data of the receiver point. Therefore, the magnitude of the dispersion may be inversely correlated with the accuracy of the derived position data of the receiver point. In particular, when the vector modulus is small, it can be determined that the accuracy of the derived position data of the receiver point is high, and when the vector modulus is large, it can be determined that the accuracy of the derived position data of the receiver point is low.

It should be noted that in this embodiment, the dispersion or vector modulus may be used alone to evaluate the accuracy of the derived position data of the receiver point. However, in order to improve the accuracy and objectivity of the evaluation, the dispersion and vector modulus may be used in combination to evaluate the accuracy of the derived position data of the receiver point.

Figure 4A:
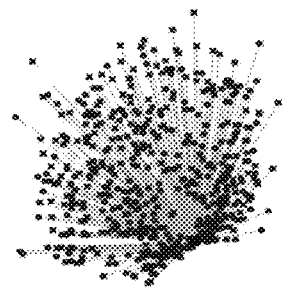
FIG. 4a is a schematic diagram of a dispersion and a vector modulus for a derived position data of a receiver point in an embodiment of the present disclosure.
Figure 4B:
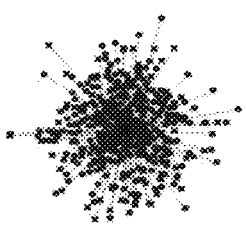
FIG. 4b is a schematic diagram of a dispersion and a vector modulus for another derived position data of a receiver point in an embodiment of the present disclosure.

For example, for a receiver point in the South China Sea, derived position data A of the receiver point may be obtained by using a first break positioning method, and derived position data B of the receiver point may be obtained by using another first break positioning method. FIG. 4a is a schematic diagram of a dispersion and a vector modulus determined for the derived position data A. FIG. 4b is a schematic diagram of a dispersion and a vector modulus determined for the derived position data B. By comparing FIG. 4a with FIG. 4b, it can be seen that both the dispersion and the vector modulus are smaller in FIG. 4b than in FIG. 4a. Therefore, it can be determined that as compared with the derived position data A, the derived position data B has a higher accuracy and is closer to the actual coordinates of the receiver point.

In an example scenario of this embodiment, the receiver point may be a receiver point in OBN data for a certain area of the South China Sea. The receiver point may have a line number of 415 and a point number of 501.0. The derived position data of the receiver point may be (641879.9, 1158777.8, 57.7). The receiver point may be associated with at least one shot point. The residual vectors associated with the receiver point and respective ones of the shot points may be constructed based on the offset, the first arrival time and the velocity of first arrival wave associated with the receiver point and the shot points. It is determined from the residual vectors that the derived position data of the receiver point has a dispersion of 1.84 and a vector modulus of 0.002.

In this embodiment, the residual vector may be constructed based on the characteristic parameter associated with the receiver point and the respective shot point. The characterization parameter of the derived position data of the receiver point may be determined based on the residual vector. The accuracy of the derived position data of the receiver point may be evaluated based on the characterization parameter. In this way, it is possible to assess the advantages and disadvantages of different receiver point positioning methods.

Figure 5:
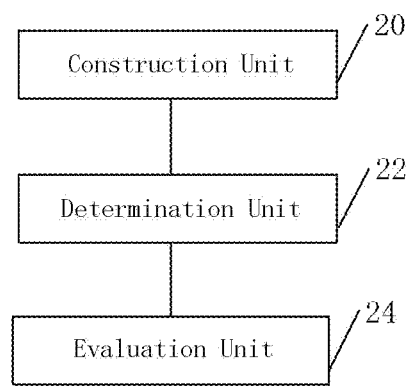
FIG. 5 is a functional diagram of an apparatus for evaluating accuracy in positioning a receiver point according to an embodiment of the present disclosure.

Referring to FIG. 5, an embodiment of the present disclosure further provides an apparatus for evaluating accuracy in positioning a receiver point, comprising:

a construction unit 20 configured to construct a residual vector associated with a receiver point and a respective shot point based on a characteristic parameter, wherein the receiver point is associated with at least one shot point and a derived position data is obtained for the receiver point, and a pair of the receiver point and the respective shot point is associated with a characteristic parameter which includes an offset, a velocity of first arrival wave and a first arrival time;

a determination unit 22 configured to determine a characterization parameter of the derived position data based on the residual vector; and an evaluation unit 24 configured to evaluate accuracy of the derived position data based on the characterization parameter.

In the 1990s, it is easy to tell whether a technical improvement is a hardware improvement (for example, an improvement to a circuit structure such as a diode, a transistor, a switch, etc.), or a software improvement (an improvement to a methodical process). However, with the development of technologies, many improvements to methodical processes nowadays can be regarded as improvements to the hardware circuit structures. Basically, all improved methodical processes can be programmed into a hardware circuit to obtain corresponding hardware circuit structures. Therefore, it can not be ruled out to implement an improvement to a methodical process with a physical hardware module. For example, a Programmable Logic Device (PLD) (e.g., Field Programmable Gate Array (FPGA)) is an integrated circuit of which logical functions are determined by user's programming of the device. The designer programs by himself to "integrate" a digital system into a piece of PLD, without needing to design and manufacture the ASIC chip by a chip manufacturer. Moreover, at present, instead of manually manufacturing the integrated circuit chips, such programming is mostly implemented by using software "logic compiler", which is similar to the software compiler used for program development, and the source codes to be compiled should be written in a specific programming language referred to as Hardware Description Language (HDL). There are many kinds of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., and currently the most commonly used is Very-High-Speed Integrated Circuit Hardware Description Language (VHDL) and Verilog. It is comprehensible to those skilled in the art that a hardware circuit that implements a methodical process can be easily obtained by adequately programming the methodical process into an integrated circuit with the aforementioned hardware description languages.

The system, apparatus, modules or units described in the foregoing embodiments can be implemented by a computer chip or entity, or implemented by a product having a specific function.

The system, apparatus, modules or units described in the foregoing embodiments can be implemented by a computer chip or entity, or implemented by a product having a specific function. A typical device implementation is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device, or a combination of any of these devices.

As can be seen from the description of the above embodiments, persons skilled in the art can clearly understand that the present disclosure can be implemented by means of software plus a necessary universal hardware platform. Based on this understanding, the essence of the technical solution of the present disclosure or the part making a contribution to the prior art can be embodied in the form of a computer software product, which may be stored in a storage medium, such as a ROM/RAM, a magnetic disk, an optical disk, etc., and include several instructions to enable a computer device (a personal computer, a server, a network device, etc.) to carry out the embodiments of the present disclosure, or the methods described in some parts of the embodiments.

The embodiments in the present disclosure are described in a progressive manner, which means descriptions of each embodiment are focused on the differences from other embodiments, and the descriptions of the same or similar aspects of the embodiments are applicable to each other. In particular, for the embodiments involving systems, of which essence is analogous to that of the method embodiments, reference can be made to the method embodiments, and detailed description may be omitted.

The present disclosure is applicable to a lot of general- or special-purpose computer system environments or configurations, such as a personal computer, a server computer, a handheld or portable device, a tablet device, a multiprocessor system, a microprocessor-based system, a set-top box, a programmable consumer electronic device, a network PC, a minicomputer, a mainframe computer, a distributed computing environment including any of the above systems or devices, etc.

The present disclosure can be described in a general context of a computer executable instruction executed by a computer, for example, a program module. Generally, the program module may include a routine, a program, an object, a component, a data structure, and the like for performing a specific task or implementing a specific abstract data type. The present disclosure may also be implemented in a distributed computing environment. In the distributed computing environment, a task is performed by remote processing devices connected via a communication network. Further, in the distributed computing environment, the program module may be located in local and remote computer storage medium including a storage device.

Although the present disclosure has been described through the embodiments, persons of ordinary skill in the art know that there are many modifications and variations to the present disclosure without departing from the spirit of the present disclosure, and it is intended that the appended claims include those modifications and variations without departing from the spirit of the present disclosure.

What is claimed is:

1. A method for evaluating accuracy in positioning a receiver point, which is associated with at least one shot point, and for which a derived position data is obtained, wherein a pair of the receiver point and a respective shot point is associated with a characteristic parameter which includes an offset, a velocity of first arrival wave and a first arrival time, the method comprising,
   constructing a residual vector associated with the receiver point and the respective shot point based on the characteristic parameter;
   determining a characterization parameter of the derived position data based on the residual vector, the characterization parameter including a dispersion and/or a vector modulus; and
   evaluating accuracy of the derived position data based on the characterization parameter.

2. The method according to claim 1, wherein the derived position data is obtained with a first break positioning algorithm, and the characteristic parameter is obtained based on the derived position data.

3. The method according to claim 1, wherein the direction of the residual vector associated with the receiver point and the respective shot point is a direction from the receiver point to the shot point.

4. The method according to claim 1, wherein a modulus of the residual vector associated with the receiver point and the respective shot point is calculated with an equation $|\vec{\delta}_i|=x_i-t_i\times v_i$, wherein $|\vec{\delta}_i|$ denotes a residual vector associated with the receiver point and an $i^{th}$ shot point; $x_i$ denotes an offset between the receiver point and the $i^{th}$ shot point; $t_i$ denotes a first arrival time associated with the receiver point and the shot point; and $v_i$ denotes a velocity of first arrival wave associated with the receiver point and the $i^{th}$ shot point.

5. The method according to claim 1, wherein the characterization parameter comprises a dispersion, and determining the characterization parameter of the derived position data comprises:

calculating a dispersion of the derived position data with an equation $$\varphi = \sqrt{\frac{\sum_{i=1}^{N} |\vec{\delta_i}|^2}{N}},$$

wherein $\varphi$ denotes the dispersion; N denotes the number of shot points associated with the receiver point; and $\vec{\delta_i}$ denotes a residual vector associated with the receiver point and an $i^{th}$ shot point.

6. The method according to claim 5, wherein a magnitude of the dispersion is inversely correclated with the accuracy of the derived position data of the receiver point.

7. The method according to claim 1, wherein a magnitude of the dispersion is inversely correlated with the accuracy of the derived position data of the receiver point.

8. The method according to claim 1, wherein the characterization parameter comprises a vector modulus, and determining the characterization parameter of the derived position data comprises:

calculating a vector modulus of the derived position data with an equation $\Delta = |\sum_{i=1}^{N} \vec{\delta_i}|$, wherein $\Delta$ denotes the vector modulus, N denotes the number of shot points associated with the receiver point; and $\vec{\delta_i}$ denotes a residual vector associated with the receiver point and an $i^{th}$ shot point.

9. The method according to claim 8, wherein a magnitude of the vector modulus is inversely correlated with the accuracy of the derived position data.

10. The method according to claim 1, wherein a magnitude of the vector modulus is inversely correlated with the accuracy of the derived position data.

11. The method according to claim 1, wherein the derived position data is a coordinate value of the receiver point in a geometry, and the method further comprises, before determining the characterization parameter of the derived position data, translating the coordinate point of the receiver point in the geometry to an origin of the geometry.

12. An apparatus for evaluating accuracy in positioning a receiver point, comprising:

a construction unit configured to construct a residual vector associated with a receiver point and a respective shot point based on a characteristic parameter, wherein the receiver point is associated with at least one shot point and a derived position data is obtained for the receiver point, and a pair of the receiver point and the respective shot point is associated with the characteristic parameter which includes an offset, a velocity of first arrival wave and a first arrival time;

a determination unit configured to determine a characterization parameter of the derived position data based on the residual vector, the characterization parameter including a dispersion and/or a vector modulus; and an evaluation unit configured to evaluate accuracy of the derived position data based on the characterization parameter.

* * * * *